United States Patent Office 2,817,621
Patented Dec. 24, 1957

2,817,621

GERMICIDAL COMPOSITIONS COMPRISING SLOWLY REACTIVE N-CHLORO COMPOUNDS AND AN IODIDE

Henry C. Marks, Glen Ridge, N. J., and George U. Glasgow, Bronx, N. Y., assignors to Wallace & Tiernan Incorporated, Belleville, N. J., a corporation of Delaware No Drawing. Application April 9, 1956,
Serial No. 576,829

17 Claims. (Cl. 167—17)

This invention relates to compositions for germicidal or disinfecting purposes and is particularly directed to a novel product prepared in a convenient, stable, solid form, for example in a powdered or granular state, the product being readily adapted for packaging and distribution and being easily applicable to use by incorporating a suitable quantity of it in plain water or other aqueous medium.

For germicidal purposes a considerable number of N-chloro (or chloramine) compounds have been proposed and, as distinguished from other types of disinfectants, should theoretically be very useful, e. g. in providing the effective anti-bacterial properties of available chlorine and at the same time, in being relatively safe and convenient to use. It has now been found that among these compounds two general classes may be recognized, e. g. as differing rather markedly in their effectiveness or reactivity in a number of respects. The compounds of one class, which may be designated (for convenient reference) as rapidly active, are unusually effective against microorganisms in the absence of other contamination, their effectiveness thus being notably significant in solution in water which is otherwise pure or at least free of non-microbial, organic contamination. Examples of this first class of N-chloro compounds, which kill bacteria very rapidly, are dichloramine-T and dimethyl dichlorohydantoin. These compounds, however, are likewise characterized by high chemical reactivity, so that when used in the presence of contaminating organic matter, such as food solids, they are promptly inactivated by reaction with the contamination, and their germicidal activity is correspondingly curtailed, or indeed destroyed.

The second of the two classes of N-chloro compounds mentioned above may be defined, in relation to the first class, as slowly active, it being understood that such term is used herein simply for convenience of reference and that the compounds are in fact quite useful and might even be considered to act with relative rapidity in contrast to some disinfectant substances of other types. That is to say, the compounds of this class, exemplified by azochloramid and chloromelamine, are considerably slower in their bactericidal action than the substances of the first group, the slower activity of these other compounds being exhibited in pure, i. e. otherwise unpolluted water, and likewise under conditions of non-microbial organic contamination. On the other hand, the activity of the compounds of this second class is not appreciably altered by such organic contamination (e. g. contamination of the medium with organic substances or materials other than bacteria), and in consequence they are more effective and more generally useful in such environment than the more reactive compounds. That is to say, they are basically less reactive toward organic matter so that their inherent germicidal activity is maintained for a considerably longer time.

Disinfectant or germicidal compositions are quite often used at some elevated temperatures, e. g. in warm or hot water, such circumstances generally tending to enhance the reactivity of compounds containing available chlorine. With even a slightly elevated temperature of solution, the compounds of the first class described above, are thus likely to be still more rapidly consumed, since chemical reaction with contamination is greatly accelerated. The compounds of the second class, however, are found to maintain their anti-microbial properties over a useful length of time at somewhat elevated temperatures, even in the presence of organic contamination, and they are therefore more valuable under such conditions. Examples of these circumstances of possible use of the compounds are in rinsing eating utensils in warm water or in washing vegetables or like articles (which may be contaminated) in slightly warm water.

While at these higher temperatures the inherent slowness of bactericidal action of the second group of compounds is somewhat obviated, their normally delayed response is even further retarded at lower temperatures, particularly in relatively cold water or other circumstances below normal room temperatures of, say 65° to 75° F. Indeed when used under lower temperature conditions or even sometimes at room temperatures or above, the killing rate of the second class of compounds may be or become too slow for a desired degree of usefulness. It will be appreciated that this defect is rather serious, especially in compositions for general use by the public, since the user can never be sure of having water available at the necessary room or preferably elevated temperature. If there is only cold water in which to make up a solution of a compound that is promptly effective at elevated temperatures alone, the user may very well fail to obtain the desired degree of disinfection with the solution.

With the aim of overcoming the above problems which arise from inherent characteristics of the various types of N-chloro compounds, the present invention is grounded on the discovery that by combining a suitable N-chloro compound of the second class with an appropriate iodide, very preferably a minor proportion of the latter, a composition can be produced, e. g. in the convenient form of a dry powder, wherein the slow or potentially slow killing rate of the N-chloro compound is in effect overcome without simultaneously impairing either the stability (i. e. the keeping qualities) or the bactericidal activity of the composition, a further and particular result being that the bactericidal activity remains unimpaired in use of the compound when non-microbial organic contamination is present either at room or lower or somewhat elevated temperatures.

As the cooperating ingredient of the novel composition, any one (or combination) of various iodides may be employed, the chief requirement being ready solubility in water; for example, suitable iodides are those of the alkali metals, such as potassium iodide and sodium iodide, and likewise alkaline earth and other metallic iodides of suitable solubility and even organichydroiodides, as exemplified by glycine hydroiodide. It will be apparent that as combined to constitute an iodide, the radical or constituents other than iodine should be relatively inert to attack by chlorine; that is to say, an iodide of organic character is satisfactory providing it is such that there is no reaction between the N-chloro compound and the organic parts of the molecule. In general, it is particularly important that the iodide content (however present) in the new composition be small relative to the total content of active chlorine; the amount of iodine (measured as such, although actually incorporated as iodide) should usually be sufficient to react, in the manner described below, with about 2% to about 20% of the total available chlorine, the quantity of iodine thus being equivalent, so to speak, to a selected small percentage (in this range) of the chlorine, and the chlorine, for such purpose, being determined in the conventional manner as available chlorine in the N-chloro compound.

As further explained below, the composition (of the chlorine compound and the iodide) should also contain appropriate buffering material for good results under most conditions of use, and there may also be present such inert diluents as are necessary or desirable (but very preferably, no reducing substances), and likewise one or more surface active agents to provide detergent and surface wetting properties as well as to facilitate rapid solution of the ingredients. For use, the dry powdered or finely granular composition is simply dissolved in a suitable quantity of water, resulting in a disinfecting or germicidal solution that may be effectively employed for a wide variety of purposes, e. g. in disinfecting cooking and eating utensils, various structural surfaces, apparatus, furnishings and equipment, and likewise for washing natural products such as fruits and vegetables.

When put to use, for example in the manner described above, the new composition is found usually effective in providing a prompt and continuing bactericidal effect over a wide variety of temperatures, i. e. not only at elevated temperatures as up to 140° F. or more, but also at room temperatures, e. g. of the order of 65° to 80° F., and especially at lower temperatures, even down to 35° F. or so. When the composition is dissolved in water, part of the active chlorine reacts quite promptly with the iodide to liberate iodine, such reaction occurring very effectively at the lower as well as the higher temperatures. Thus liberated in an elemental or available form, iodine is relatively active against bacteria, even at low temperatures. Hence at room or lower temperatures, the slow killing rate of the N-chloro compound is in effect overcome, in that the released iodine provides a germicidal activity which is much more rapid.

Indeed where the solution is in constant re-use, as for dipping or washing successive articles in a body of it, the active iodine content may under some circumstances be considerably re-established over a period of time, e. g. in that the expected reaction with organisms (or indeed certain other contamination) is usually understood to convert the free iodine to an iodide form, which, if in a state presenting iodide ions, may then be reconverted, in useful part, to active iodine by the remaining, excess available chlorine of the N-chloro compound present; in fact, this sequence of reactions may sometimes be repeated through a number of cycles, with the effect of a somewhat continuing maintenance of free iodine in the solution. In general, however, the primary object of the invention is believed to be served by the originally released iodine, which is thus found very usefully effective, for the desired germicidal purposes in combination with the considerably slower action (at the lower temperatures) of the N-chloro substance. While at the higher temperatures, i. e. temperatures of the water substantially above 80° F. or so, the liberated iodine may also be advantageous (when the solution is fresh), the N-chloro compound is itself then quite effective for bactericidal purposes, in a reasonably prompt and continuing manner.

Although the reaction, and indeed the repeated reaction of chlorine itself or of certain chloramines to liberate iodine from iodides has been known and employed in other ways (e. g. in sterilizing certain kinds of water supplies, by adding iodide and continuously feeding chlorine), the present composition is believed to represent a novel mode and novel circumstances and agents, for utilizing the iodine-releasing reaction, i. e. for the attainment of new and very unusual results in imparting special, extended utility to solid, germicidal compositions. That is to say, the present composition represents a new, valuable and distinctive product, involving the special features not only of the inclusion of iodide but also of the proportional relationship of the N-chloro compound and the iodide wherby without sacrifice of chlorine values an effective disinfecting action is obtained over a far wider range of temperatures (of solution) and of other conditions than has heretofore been possible with N-chloro compounds of either a slow or rapid reaction type. Thus at the higher temperatures, the present composition partakes of the advantages of the less active N-chloro compounds, e. g. in then furnishing a relatively rapid action of active chlorine on bacteria without becoming too soon inactivated by organic contamination (as occurs in the case of the fast-reacting substances, especially in warm water). At the same time, by the described liberation of iodine which functions in cooperation with the slower, available chlorine, the composition affords an equally effective action at ordinary or lower temperatures, heretofore unattainable with the slow-reacting class of chlorine compounds. The present composition is exceptionally stable and, as explained, is not limited to any particular temperature of the water employed for making up the solution in which it is used; cold, temperate or warm water, as available or as required for other reasons, may be employed without detriment to the desired germicidal properties.

As indicated above, the selected minor character of the proportion of iodide present is particularly significant. If there were sufficient iodide to consume all or most of the available chlorine (in the N-chloro compound) for reaction to liberate iodine, the composition would have little or no advantage over the direct use of iodine per se. Especially for purposes of the sort mentioned above, reliance on free iodine alone as contributing the germicidal properties to the solution falls short of the present results; free iodine is too reactive and at the higher temperatures, with organic matter present, the iodine would be dissipated much too soon and its disinfecting properties would vanish. However, by limiting the quantity of iodide (and thus of releasable iodine) to an amount reacting with a minor fraction of the available chlorine, say in a range from about 2% up to less than 50% and ordinarily not more than about 25%, it has been found that the desired, new results of the present composition are admirably realized. Extensive tests have revealed that with such proportions, the composition affords an iodine concentration immediately which is quite effective at low temperatures even when the solution has been freshly made up, the iodine preferably being adapted to continue its activity by reestablishment as explained above; yet in high temperature solutions where the liberated iodine may be rapidly consumed (especially if there is non-microbial organic contamination present) there is abundant chlorine left, in the large excess of N-chloro compound, to maintain disinfecting activity over a desirably long period of time.

The iodide is thus to be present in amount sufficient to react with a minor fraction of the total available chlorine in the N-chloro compound, leaving the major fraction of such chlorine to function directly, as explained above. In other words, for release of iodine, the iodide is only sufficient to consume less than half (i. e. a minor rather than an major fraction) of the available chlorine. For example, in the case of a composition containing one part by weight of trichloromelamine (which has 92% available chlorine as stated in the examples below), it is readily calculated that one-half of the available chlorine would be consumed in reaction with 2.1 parts by weight of potassium iodide, to release iodine. Hence in this situation the amount of potassium iodide required for such reaction with a minor fraction, i. e. less than one-half, of the chlorine, would be less than 2.1 parts for each part of trichloromelamine.

As indicated above, N-chloro compounds of more rapidly reactive type hereinabove grouped as the so-called first class, have been found to be unsuitable for the purposes of the present composition. Not only are they too rapidly inactivated by organic contamination at high temperatures, but their reaction with the iodide proceeds quickly beyond the point of iodine release, i. e. to the extent of oxidizing the free iodine to iodate, which has no effective germicidal properties in the solution. If an excess of iodide is present, i. e. more than will react with the total available chlorine to yield iodine, the highly reactive N-chloro compounds can be made to afford a quantitative yield of available iodine, but the inclusion of an excess of iodide would wholly defeat the purpose of the present composition, by eliminating all of the N-chloro compound at the very outset. Furthermore even where the iodide is present in a very minor proportion, the reaction to produce iodate consumes an objectionably large quantity of the chlorine, in that six times as much oxidizing capacity is required to oxidize iodide to iodate as merely to liberate iodine; instead of consuming, say, an expected 10% of the chlorine, the iodide will in effect consume 60%, leaving an impoverished solution which still contains no germicidal iodine, and has only 40% of the original chlorine.

On the other hand, the substantially more slowly reactive types of N-chloro compound herein contemplated as constituting the second class of such substances and suitable for the present invention, are found to produce so little iodate that they are eminently satisfactory as ingredients of the improved germicidal product. Illustrative examples of compounds of the stated character, satisfactory in these respects, are a number of specific classes of such substances, including the following: chloromelamine (particularly trichloromelamine, although melamine chlorinated to the extent of one to three chlorine atoms is generally deemed suitable) and N-chloro ammeline, these being representative of derivatives of imides and amides of cyanuric acid; N,N' dichloroazodicarbonamidine; N-chloro acetyl urea and N,N' dichlorobiuret, representing the class consisting of urea, simple alkyl and acyl ureas, and polyureas; and N-chloro succinimide, representing the imides of carboxylic acids. The N-chloro compound material is thus to be selected from the group consisting of: N-chloro derivatives of imides and amides of cyanuric acid, N,N' dichloroazodicarbonamidine, N-chloro derivatives of urea, simple alkyl and acyl ureas, and polyureas, and N-chloro derivatives of the imides of carboxylic acids.

It will be understood that for use in the invention the N-chloro compounds should very preferably be chlorinated, e. g. in the case of those defined as derived from cyanuric acid, to the extent of less than four chlorine atoms per molecule, and in the case of the above class of ureas, to the extent of not more than one chlorine atom for each unit of urea. Similarly each compound should satisfy, as do the examples named above, certain readily determinable criteria, viz. that the compound exists in a stable, solid, appropriately water-soluble form at ordinary temperatures and that it contain available chlorine capable of reacting promptly with soluble iodide, in aqueous solution (at 50° F. and pH 4 to 5), to liberate available (e. g. free, suitably germicidal) iodine. The compound, even though present in amount providing ten times as much available chlorine as will be consumed in reaction with a given amount of iodide to produce iodine, should not, within 30 minutes at 70° F., oxidize as much as 50% of the liberated iodine to iodate. The compound should also, of course, be characterized by inherent germicidal activity of its available chlorine content, including relative rapid activity at elevated temperatures of the character defined above, but it appears that in general an N-chloro compound of sufficient reactivity to convert iodide to iodine is inherently characterized by bactericidal properties sufficient for purposes of the present invention. In consequence, therefore, the physical characterization set forth above and the characterization of reactivity with iodide to release iodine without large conversion to iodate (being readily determinable in any case by simple test) constitute accurate and adequate definition, for present purposes, of a slowly reactive N-chloro compound.

For best results the compositions should not be employed at a high pH value, i. e. at pH values in the alkaline range; for instance, at a pH appreciably above 7, there is serious tendency of even the slowly reactive N-chloro compounds to form iodate and thus in effect to nullify the advantages of the composition. Although conditions of use may in some cases afford the preferred value of pH in the solution, e. g. about 5 or below, a further, specific feature of the invention is the provision, in the composition, of buffering agents which will keep the pH at a suitable value when the composition is dissolved in water. While useful results are attainable at pH values as high as 6 or 6.5, the described pH of 5 or less (even down to a value of 2.5 or so) is preferably maintained, a pH of 5 being generally sufficient and usually most convenient to establish. Any of various known buffers, e. g. involving phosphate, citrate, tartrate or other ions, and embodied in the form of acid salts or mixtures of acids with neutral or acid salts, may be employed; some specific examples of such buffers are given hereinbelow, but it will be understood that various commonly known buffering agents are suitable, and may be incorporated in amounts appropriate to secure and maintain the selected pH value, in accordance with well known chemical principles. For incorporation in the solid compositions of the invention, the buffering agents should, of course, be solid compounds.

While the N-chloro compounds of slowly reactive character are in themselves generally quite stable, so that when reasonably enclosed in a container or other package they may be stored for relatively long periods without substantial loss of their available chlorine content, some care should be taken to prevent premature reaction between the N-chloro compound and the iodide. Over short periods and with practically no moisture present, the simple mixture of the N-chloro compound and the iodide, each in powder form, is likely to be stable without other precautions. However, if more than a mere trace of moisture is present, there is a tendency to the liberation of iodine in the solid product as it stands in storage, with consequent impairment of its effectiveness due to volatilization of the iodine. Furthermore, impurities in the chlorine compound may tend to increase the likelihood of reaction with iodide, i. e. if such impurities are of oxidizing character; this problem is not infrequently apt to arise, since the impurities in a slowly reactive N-chloro compound may often be chlorine compounds of the more reactive type. As impurity of otherwise, any content of the more reactive substances should ordinarily be at most very low in the present compositions (e. g. less than a few percent), but it will be appreciated that because the amount of iodide may be small (down to the equivalent of as little as 2% of the total available chlorine) a small content of highly reactive chlorine compounds can, if permitted to do so, convert enough iodide to iodine (which is promptly lost by evaporation) or perhaps even to iodate, to impair the value of the product over a period of storage.

It has been found, however, that the danger of iodine loss during storage may be minimized by coating the particles of iodide with a water-soluble, inert material that tends to insulate the iodide from the N-chloro compound and thus serves to inhibit reaction between the chlorine and the iodide while the composition is stored in a suitable container or package, and before its immersion in water, for use. Various, suitably impervious materials may be used for such coating or other insulating layer (between the iodide and the chlorine compound), providing such material is rather rapidly soluble in water and is suitably inert to the chlorine compound, the iodide and the ultimately liberated iodine (it being understood that the composition should not contain reducing agents, by way of impurity or otherwise).

Stable organic coatings such as methyl cellulose and ethyl cellulose have been found useful for coating the iodide particles, while particularly effective coatings, having markedly greater stability than the cellulose compounds just mentioned, are provided by certain types of inorganic salts. For instance, useful protection against decomposition of the iodide has been obtained with a coating consisting of a mixture of sodium carbonate and monosodium phosphate, e. g. a coating built up by successive spraying or like applications of a concentrated solution containing both salts. Outstanding results, however, are afforded by the so-called glassy phosphates, of which common examples are the polymetaphosphates such as the product usually called sodium hexametaphosphate, in its glassy rather than micro-crystalline form. These water-soluble phosphates, usually known as polyphosphates and having a physical character commonly described as glassy (being usually salts of alkali metals, especially sodium) have been found capable of forming a tough film around the iodide crystals and thus providing a particularly stable and resistant coating, especially at high temperatures as in the tropics, for the desired protection of the iodide. These phosphates are very chemically resistant and thus are not themselves attacked by the chlorine. While in bulk state a glassy phosphate, such as sodium hexametaphosphate, is rather slowly soluble in water, it has, for present purposes, a sufficiently high solubility rate when in the form of a film on the iodide particles.

Combined or plural coatings may also be useful. For instance, some advantage has been found in first coating the iodide particles with monosodium phosphate and then applying a further coating of the glassy hexametaphosphate. Thus a considerable variety of alkali metal salts are useful for coating purposes, e. g. carbonates and phosphates in mixtures, polyphosphates, and combination coatings as of phosphate and polyphosphate.

The application of a suitable coating to the iodide particles may be achieved in any convenient manner, preferably in such fashion as to maintain the integrity of the particles while the coating material is being applied in solution or otherwise. For example the powdered iodide can be mixed with a suitable solution of methyl cellulose or ethyl cellulose and thus made into a paste. Upon then evaporating the solvent, the resulting, hard lumpy material may be ground to a coarse powder which is found to consist of particles of iodide appropriately coated, i. e. to a useful extent, with a film of the cellulose compound employed. In thus applying the cellulose coatings, the solvent for the selected compound may be of organic character, for example chloroform, so as to prevent dissolving the iodide in the paste to any appreciable extent.

In the case of the glassy phosphates, the iodide particles can be treated by spraying them with a concentrated solution of the phosphate in water, while tumbling or turning the particles and while applying hot air or other agent to heat the mass and drive off the water. In such fashion, and usually by successive thin films or coatings so applied, a suitably thick film of phosphate is progressively built up on the crystals without dissolving a substantial part of the iodide (which might then separate on ultimate drying), and without cementing the particles together in large lumps. Coatings with other inorganic salts or salt mixtures as mentioned above, may be achieved in the same way; for example, after several thin coats of sodium monophosphate have been so applied, further and final coats of hexametaphosphate can be added to yield a fully protective layer on the iodide particles.

Alternatively in some cases, the danger of iodine loss may be reduced without extraneous coating but by forming the iodide into pellets which are mixed substantially homogeneously, throughout the complete composition. By pelletizing the iodide, its exposed surface is made relatively very small, with consequent minimization of reaction by chlorine, over reasonable lengths of time. As will be appreciated, the iodide pellets, e. g. formed by moist tumbling and drying or by other suitable procedure, should be small enough and sufficiently permeable that they will dissolve rather promptly when the complete composition is introduced in water.

The following are specific examples of various types of the new composition, employing different N-chloro compounds, different buffers, different iodides, as well as different proportions of the various ingredients (including the surface-active or wetting agents) and different methods of coating the iodide, it being understood that still further variation of ingredients, proportions and the like may be adopted as circumstances require. Any of a considerable variety of surface-active agents (which form no critical part of the invention) can be used, examples being the arylalkyl sulfonates, sodium lauryl sulfate, and the like. While in all of the examples where a coating is used, the presently preferred glassy phosphate is named, it will be understood that other coatings may be substituted if desired; and the glassy phosphate or other coating may be similarly used in other examples.

EXAMPLE I

A uniform mixture of the following dry ingredients, in powder form, provides a highly effective composition for disinfecting or germicidal purposes. In this instance, sufficient iodide is included to react with about 2.5% of the total available chlorine. The buffer is a mixture of citric acid and acid sodium phosphate, which is found to keep the pH of an aqueous solution of this composition at about 5 or below, even in the presence of as much as 500 p. p. m. alkalinity (as $CaCO_3$) in the water. The quantities of ingredients are stated (as elsewhere herein, unless the contrary appears) as percentages by weight:

| | Percent |
|---|---|
| Trichloromelamine (92% available $Cl_2$) | 22 |
| Arylalkyl sulfonate (anionic wetting agent) | 12 |
| Citric acid (anhydrous) | 50 |
| Monosodium dihydrogen phosphate (anhydrous) | 13.5 |
| Potassium iodide (30 mesh) | 2.5 |

EXAMPLE II

In this instance, a satisfactory disinfectant consists of the following dry ingredients, intimately and homogeneously mixed, and containing enough iodide, here in the form of an organic hydroiodide, to react with about 5% of the total available chlorine:

| | Percent |
|---|---|
| Trichloromelamine (92% available $Cl_2$) | 24 |
| Arylalkyl sulfonate (anionic wetting agent) | 13 |
| Citric acid (anhydrous) | 55 |
| Diglycine hydroiodide $(CH_2NH_2COOH)_2HI$ | 8 |

EXAMPLE III

In this example of a similarly effective germicidal composition, illustration is afforded of the use of ethyl cellulose to coat the potassium iodide, the iodide being present in sufficient amount to react with about 5% of the total available chlorine. The coated potassium iodide is made up to contain about 50% sodium hexametaphosphate, i. e. 50% of the total iodide and hexametaphosphate. This coating on the iodide was applied by spraying treatment as indicated above and as more specifically described hereinbelow. The following ingredients constituted the complete composition, including buffering material substantially as in Example I (rather than simply a citric acid buffer as in Example II) and utilizing the coated iodide as just explained:

| | Percent |
|---|---|
| Trichloromelamine (92% available chlorine) | 21 |
| Arylalkyl sulfonate (anionic wetting agent) | 11 |
| Citric acid (anhydrous) | 47 |
| Monosodium dihydrogen phosphate (anhydrous) | 12 |
| Potassium iodide | 4.5 |
| Sodium hexametaphosphate | 4.5 |

EXAMPLE IV

In this composition, a somewhat lower buffering content and likewise a lower content of surface-active agent (again an arylalkyl sulfonate) are employed, there being again, however, sufficient iodide to react with about 5% of the total available chlorine. Here the iodide was again coated with sodium hexametaphosphate in the same manner, but only to the extent of about 28% of the coated particles. The following dry, finely divided components (including the coated iodide particles) were homogeneously mixed to yield an effective disinfecting composition:

|  | Percent |
|---|---|
| Trichloromelamine (92% available $Cl_2$) | 35 |
| Surface-active agent | 6 |
| Monosodium dihydrogen phosphate (anhydrous) | 46.4 |
| Potassium iodide | 7.6 |
| Sodium hexametaphosphate | 3 |

EXAMPLE V

In this useful germicidal product, the chlorine compound is dichlorobiuret, and as illustrative of another variation of composition, sufficient iodide is included to react with about 10% of the total available chlorine. The product thus constituted a uniform mixture of the following dry, divided ingredients:

|  | Percent |
|---|---|
| Dichlorobiuret (80% available chlorine) | 44 |
| Surface-active agent | 10 |
| Monosodium dihydrogen phosphate | 29 |
| Potassium iodide | 17 |

In the following Examples VI, VII and VIII, the iodide is provided in amounts sufficient to react with 15%, 20% and 40%, respectively, of the total available chlorine in the mixed material.

EXAMPLE VI

|  | Percent |
|---|---|
| N-chloro ammeline | 33.3 |
| Potassium iodide | 14.1 |
| Arylalkyl sulfonate (anionic wetting agent) | 10 |
| Monosodium dihydrogen phosphate (anhydrous) | 10 |
| Citric acid (anhydrous) | 32.6 |

EXAMPLE VII

|  | Percent |
|---|---|
| Dichlorobiuret | 25 |
| Potassium iodide | 18.8 |
| Arylalkyl sulfonate (anionic wetting agent) | 10 |
| Monosodium dihydrogen phosphate (anhydrous) | 10 |
| Citric acid (anhydrous) | 36.2 |

EXAMPLE VIII

|  | Percent |
|---|---|
| Trichloromelamine | 21.5 |
| Potassium iodide | 37.5 |
| Arylalkyl sulfonate (anionic wetting agent) | 10 |
| Monosodium dihydrogen phosphate (anhydrous) | 10 |
| Citric acid (anhydrous) | 21 |

These and other compositions embodying the present invention have been found to afford highly efficient disinfecting properties when employed in a desired strength of water solution, and at temperatures, e. g. of the water used, varying over as wide a range as may normally be expected in practice, for instance, from 32° to 150° F. It will be understood that the concentration of the composition in its solution of use may vary with requirements, i. e. the requirement for sterilizing effect; a convenient mode of measuring or predetermining the concentration of the solution is by its chlorine content as achieved with the available chlorine which the N-chloro compound supplies. Simply by way of example, to obtain reasonably rapid germicidal action in washing various articles such as cooking and eating utensils, articles of produce and the like, a common range of concentration of disinfectant in aqueous solutions is such as to provide from 50 to 200 p. p. m. (parts per million) of available chlorine, e. g. measured as if constituting all of the available chlorine in the utilized amount of composition, it being understood that with the present invention some of this chlorine is promptly replaced with available iodine, for the special advantages described hereinabove.

The improved germicidal efficiency of these compositions has been demonstrated by numerous practical tests, of which the following set of experiments is illustrative. In these tests, a composition was employed exactly as described in Example I, and for comparison with it, two other compositions were used, each identical with the first except that in one case the potassium iodide was omitted altogether, and in the other case the amount of potassium iodide was increased to be enough for reaction with 5%, instead of 2.5%, of the total available chlorine.

In each of the three cases, of which two embodied the invention and the other did not, the powdered composition was added to water in sufficient quantity to give a total concentration of 200 p. p. m. chlorine, before any reaction with iodide. The solution in each case was also made to contain (i. e. by preliminary addition to the water) 0.1% bacto-peptone as an organic (non-living) contaminant susceptible of reaction with highly active chlorine, and also 500 p. p. m. sodium bicarbonate to simulate alkalinity frequently found in natural waters. The test was carried out at 5° C. (41° F.), thus representing what would ordinarily be considered a very adverse condition; it will be appreciated, however, that in practice the only water available may be very cold, e. g. of the order of temperature here utilized.

The bacteria used for testing germicidal effectiveness were E. coli, but the three germicidal solutions, made up as described above, were first allowed to stand for ten minutes before introducing a bacterial suspension. This waiting time simulated circumstances ordinarily found in the use of disinfecting solutions, in that some such period will often elapse between actual completion of the solution and its first use. Furthermore the waiting time afforded opportunity for any deteriorating effect which the organic contamination might have on the germicidal ingredients, e. g. such as has been observed with some prior types of disinfecting agents employing N-chloro compounds.

Then at the end of ten minutes, in the case of each of the three solutions, a bacterial inoculant was added so as to afford a final concentration, in each vessel of liquid, of 100 million E. coli cells per milliliter. At successive intervals after inoculation with bacteria, e. g. at 30 seconds, 60 seconds, and so on, samples of solution under test were withdrawn, immediately dechlorinated, and then plated on nutrient agar to determine the number of survivors, the count of surviving cells being thus made in a standard manner. After a number of such withdrawals and tests, over a total time such that in the slowest-killing solution all bacteria had finally been destroyed, each solution was then allowed to stand for a further period of 30 minutes, again simulating a waiting time likely to be found in use of these materials. At the end of this further period an additional amount of the bacterial suspension was added to each solution, i. e. to provide a renewed concentration of 100 million cells per milliliter. Thereupon at further, succeeding, short intervals, samples were withdrawn in the same manner as before and the number of surviving bacteria determined in each case.

The results of these tests are set forth in the following table, where in the first column, the recital of contact time in seconds signifies the time interval between the addition of bacteria and the removal of the sample to determine survivors. The second, third and fourth columns set forth the number of survivors found per milliliter at the end of the various contact times for the different solutions, being respectively the solution which lacked iodide and the solutions containing sufficient to react with 2.5% and 5% of the total chlorine. The symbol T, where used, indicates that there were too many surviving cells to count, and thus that the solution had not yet been appreciably effective in a bactericidal sense.

*Table of germicidal activity of three different solutions*

BACTERIA ADDED 10 MINUTES AFTER MIXING SOLUTION AND SAMPLES THEREAFTER TESTED

| Contact Time | No. Survivors per ml. | | |
|---|---|---|---|
| | No KI | 2.5% | 5% |
| 30 sec | T | 0 | 0 |
| 60 sec | T | 0 | 0 |
| 180 sec | T | 0 | 0 |
| 240 sec | 280 | 0 | 0 |
| 300 sec | 0 | 0 | 0 |

SAME SOLUTIONS ALLOWED TO STAND THIRTY MINUTES FURTHER, THEN BACTERIA ADDED AND FURTHER TESTS AS FOLLOWS

| | | | |
|---|---|---|---|
| 30 sec | T | T | 0 |
| 60 sec | T | 14 | 0 |
| 120 sec | T | 0 | 0 |
| 180 sec | 880 | 0 | 0 |
| 240 sec | 16 | 0 | 0 |
| 300 sec | 0 | 0 | 0 |

The improvement afforded by the present compositions (in the third and fourth columns of the table) is clearly demonstrated. Thus when the solution was 10 minutes old, each of the improved compositions afforded complete kill in less than 30 seconds, while without the iodide, 5 minutes were required for complete kill. As the solution aged, the sample lacking iodide improved a little, perhaps because of more effective solution of the N-chloro compound, but nevertheless required at least 4 minutes for useful disinfection and 5 minutes for complete kill. In the delayed series of tests, the solution containing the greater quantity of iodide, and thus having a greater percentage (e. g. 5% rather than 2.5%) of the chlorine replaced by iodine, afforded somewhat better results, 2 minutes being required for complete kill with the 2.5% replacement while the 5% replacement material was again killing in 30 seconds.

From these tests it is apparent that abundantly useful results are obtained with no more iodide than is required to replace 5% of the total available chlorine; indeed total destruction of the bacteria in less than 30 seconds is hardly capable of significant measurement. However, somewhat larger percentages of iodide may be employed, e. g. up to enough for replacement of 20% or so of the chlorine, particularly when it is desired to have a special margin of safety to take care of possible losses in the package over a long storage period. The use of much larger quantities of iodide than needed for about 25% of the chlorine are not ordinarily necessary, since the occurrence of storage losses of a magnitude requiring such an iodide content may also begin to have a deleterious effect on the available chlorine content and should preferably be prevented in some other way, e. g. as by maximum insulation of the iodide or maintenance of particularly dry condition of the powder. Nevertheless, compositions containing iodide to react with any amount of the chlorine less than 50% (but at least about 2%) are useful, in realizing the principal advantages of the invention.

As explained above, a most satisfactory coating for the iodide particles is provided by any one of the known, so-called glassy phosphates which is sufficiently water-soluble as applied. If desired, such coating of phosphate can be relatively thick, at least up to an arrangement wherein the coated iodide consists of 50% phosphate and 50% potassium iodide (by weight), present evidence being that the coated salt can comprise as much as 60% to 70% phosphate without impairment of the ready solubility (of the particles), and thus of the activating function of the iodide. The minimum amount of phosphate is determined by the thickness of film needed under given circumstances, to prevent or reduce attack of chlorine or chlorinous vapors on the iodide. For example, iodide-phosphate compositions containing as low as 18% sodium hexametaphosphate have been found satisfactory for many purposes, representing great improvement over uncoated potassium iodide in respect to the storage life of the composition. In general, increasing the phosphate content (from about 20%) up to 50% has been found to afford a definite increase in the stability of the mixture; the lower limit for good results is thus about 15% phosphate, and the optimum about 50%.

As explained, instead of simply mixing an aqueous solution, for example, of sodium hexametaphosphate with the iodide crystals, the phosphate is preferably applied in a way which always avoids the presence of sufficient water to dissolve appreciable iodide. One suitable practice is to place the iodide in a conventional, rotating, tablet-coating machine, and then to spray the moving mass of crystals with the sodium hexametaphosphate solution. A blast of hot air is continuously directed on the crystal mass (in a conventional manner for such apparatus) to heat the mass and to prevent accumulation of excess liquid on it, the relation between the temperature of the crystals and the rate of application of solution being controlled so that in effect, each successive film of solution dries before a further quantity of liquid is applied. In such fashion a continuous, relatively substantial film of phosphate is built up on the crystals, without forming lumps of solid material which are cemented together by dissolving or partially dissolving the iodide.

In one example of a coating process of the sort just described, a quantity of potassium iodide of approximately 40 mesh was placed in a tumbling device of the conventional type which rotates on an axis of about 45° from the horizontal at about 100 R. P. M. The crystals were heated to 90° to 100° C. with a stream of hot air and then were sprayed with a solution of sodium hexametaphosphate in water, the concentration being 120 grams per liter. The rotating mass was continually subjected to the stream of hot air throughout the process. At each application the solution was sprayed over the rotating mass until observations showed that further spray would cause the formation of lumps. At this point the spraying was discontinued until the hot air had completely dried the mass so that it was again free flowing. Then a further increment of the solution was applied by spraying in the same manner and with the same limitation, successive increments being thus applied until the final product contained one part of sodium hexametaphosphate for each 5 parts of potassium iodide, by weight. This material, when incorporated into a composition such as set forth in the above examples, afforded a highly satisfactory, stable germicidal product.

In another example of the treatment of iodide with phosphate, potassium iodide of the same mesh size as last mentioned above, was placed in the rotating drum and heated with a stream of hot air as also described. However, in this instance, additional heat was applied directly to the body of the drum so that the temperature of the potassium iodide crystals was between 120° and 140° C. The solution applied consisted of sodium hexametaphosphate in a concentration of 330 grams per liter in water. The solution was applied in the same way, i. e. by successive increments and with avoidance of lump formation, as in the above example of the coating process, except that in this instance the applications were repeated until the weight of applied sodium hexametaphosphate equalled that of the potassium iodide. When incorporated in compositions of the present invention, for instance as Example III above, the resulting product was not only entirely satisfactory for making up disinfecting solutions, but in its dry mixed state was found to be extremely stable and adapted to withstand the most rigorous conditions of storage.

It will now be seen that the compositions described herein are notably useful, in providing a stable, solid product which can be readily made up in the form of a disinfecting solution and which can be utilized, with equal success, under a wide range of temperatures, from very warm water down to water temperatures just above freezing, the composition providing a prompt and long-continuing disinfectant action under all conditions in the stated range.

This application is a continuation-in-part of our co-pending application Serial Number 258,748, filed November 28, 1951, now abandoned.

It is to be understood that the invention is not limited to the specific compositions herein set forth by way of example, but may be embodied in other forms without departure from its spirit.

We claim:

1. Material for introduction in water to provide an available chlorine-containing germicidal solution, comprising: as essentially the sole source of available chlorine, stable, water-soluble, slowly reactive N-chloro compound material which contains available chlorine capable of liberating available iodine from iodide in solution, said N-chloro compound material being such as will satisfy the following test, namely that when said N-chloro compound material is put in solution with a given amount of iodide, at 70° F. and in an amount affording ten times as much chlorine as necessary to liberate iodine from said amount of iodide, said N-chloro compound material will not oxidize as much as 50% of said last-mentioned iodine to iodate in 30 minutes; and water-soluble iodide which reacts with available chlorine in solution to liberate available iodine, said iodide being present in an amount which is just sufficient for reaction with about 2% to less than 50% of the total amount of available chlorine in the aforesaid N-chloro compound material present said N-chloro compound material being selected from the class consisting of: N-chloro derivatives of imides and amides of cyanuric acid; N,N' dichloroazodicarbonamidine; N-chloro derivatives of urea, simple alkly and acyl ureas, and polyureas; and N-chloro derivatives of the imides of carboxylic acids.

2. Material as defined in claim 1, wherein the N-chloro compound material is chloromelamine containing from 1 to 3 chlorine atoms.

3. Material as defined in claim 1, wherein said amount present of the iodide is only sufficient for reaction with about 2% to about 25% of the total amount of available chlorine in the quantity present of said N-chloro compound material.

4. Material as defined in claim 1, which comprises a mixture of particles of the N-chloro compound material, with particles of the last-mentioned iodide which are coated with water-soluble inert material to inhibit reaction between the iodide and the N-chloro compound material before immersion of the mixture in water.

5. Material as defined in claim 1, which also includes buffering material to maintain the pH of the defined material in solution, at a value below 7.

6. Material as defined in claim 1, which comprises a mixture of particles of the N-chloro compound material, with particles of the last-mentioned iodide which are coated with water-soluble glassy phosphate material of the class consisting of sodium polyphosphates, to inhibit reaction in the solid mixture between the iodide and available chlorine.

7. Material as defined in claim 1, in which the N-chloro compound material comprises trichloromelamine.

8. Material as defined in claim 1, in which the N-chloro compound material comprises N,N' dichloroazodicarbonamidine.

9. Material as defined in claim 1, in which the N-chloro compound material comprises N,N' dichlorobiuret.

10. Material as defined in claim 1, in which the N-chloro compound material comprises N-chloro acetyl urea.

11. Material as defined in claim 1, in which the iodide comprises potassium iodide.

12. Material for introduction in water to provide an available chlorine-containing germicidal solution, comprising: as essentially the sole source of available chlorine, trichloromelamine; water-soluble iodide which reacts with available chlorine in solution to liberate available iodine, said iodide being present in an amount which is just sufficient for reaction with about 2% to less than 50% of the total amount of available chlorine in the aforesaid trichloromelamine present and buffering material to maintain the pH of the defined material in solution, at a value substantially below 7.

13. Material for introduction in water to provide an available chlorine-containing germicidal solution, comprising trichloromelamine to provide the available chlorine, potassium iodide in amount sufficient for iodine-releasing action with only a minor fraction, but at least about 2%, of the available chlorine of said trichloromelamine, and buffering material to maintain the pH of a solution of the composition at a value substantially below 7, said potassium iodide being in the form of particles coated with water-soluble glassy phosphate material of the class consisting of sodium polyphosphates to inhibit reaction, in the association of the dry ingredients, between the iodide and available chlorine, said potassium iodide being present in amount of less than 2.1 parts by weight for each part by weight of trichloromelamine.

14. Material for introduction in water to provide an available chlorine-containing germicidal solution, comprising trichloromelamine and potassium iodide in amount sufficient for iodine-releasing reaction with only a minor fraction, but at least about 2%, of the available chlorine of said trichloromelamine, said potassium iodide being present in amount of less than 2.1 parts by weight for each part by weight of trichloromelamine.

15. Material for introduction in water to provide an available chlorine-containing germicidal solution, comprising: as essentially the sole source of available chlorine, chloromelamine containing from 1 to 3 chlorine atoms; and water-soluble iodide which reacts with available chlorine in solution to liberate available iodine, said iodide being present in an amount which is just sufficient for reaction with about 2% to about 25% of the total amount of available chlorine in the aforesaid chloromelamine present.

16. Material as defined in claim 15, which also includes buffering material to maintain the pH of the defined material in solution, at a value substantially below 7.

17. Material as defined in claim 15, in which the chloromelamine is trichloromelamine.

References Cited in the file of this patent

UNITED STATES PATENTS

| | | |
|---|---|---|
| 1,925,135 | Chandler | Sept. 5, 1933 |
| 1,950,956 | Wilhelm | Mar. 13, 1934 |
| 2,250,504 | Salerni | July 29, 1941 |
| 2,275,593 | Muskat | Mar. 10, 1943 |
| 2,380,970 | Kitter | Aug. 7, 1945 |
| 2,517,651 | Frost | Aug. 8, 1950 |
| 2,550,015 | Maffitt | Apr. 24, 1951 |

OTHER REFERENCES

Conant, published Abstract 612, 541, 626 O. G. 1158, September 27, 1949.